(12) United States Patent
Clare et al.

(10) Patent No.: US 7,650,037 B2
(45) Date of Patent: Jan. 19, 2010

(54) SELECTION OF THE DECODING SIZE OF A MULTIRESOLUTION IMAGE

(75) Inventors: Maryline Clare, Rennes (FR); Jeanne Guillou, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 773 days.

(21) Appl. No.: 10/823,587

(22) Filed: Apr. 14, 2004

(65) Prior Publication Data

US 2004/0218818 A1 Nov. 4, 2004

(30) Foreign Application Priority Data

Apr. 29, 2003 (FR) .................................. 03 05254

(51) Int. Cl.
*G06K 9/36* (2006.01)
(52) U.S. Cl. ...................................... 382/232
(58) Field of Classification Search ........................ None
See application file for complete search history.

(56) References Cited

U.S. PATENT DOCUMENTS 7,206,804 B1 * 4/2007 Deshpande et al. ......... 709/203

2001/0047517 A1 11/2001 Christopoulos et al. ....... 725/87
2002/0033837 A1 * 3/2002 Munro ....................... 345/654

FOREIGN PATENT DOCUMENTS

EP 0 859 335 8/1998
FR 2805640 8/2001

OTHER PUBLICATIONS

John R. Smith et al., "Content-Based Transcoding of Images in the Internet", Image Processing, Oct. 1998, IEEE, pp. 7-11.
Taubman, David et al., "JPEG2000, Image Compression Fundamentals, Standards and Practice", Kluwer International Series in Engineering and Computer Science, 642, 2002.
French Preliminary Search Report in FR 0305254.

* cited by examiner

*Primary Examiner*—Brian P Werner
*Assistant Examiner*—Elisa M Rice
(74) *Attorney, Agent, or Firm*—Fitzpatrick, Cella, Harper & Scinto (57) ABSTRACT

This method of displaying a digital image for creating a multimedia content, the image being coded in multiple resolutions, comprises steps consisting of:
  determining the number of resolutions present in the coded image,
  obtaining (E230) the data of the sub-images associated with each of the previously determined resolutions, and
  displaying (E300) all the sub-images.

21 Claims, 8 Drawing Sheets

SELECTION OF THE DECODING SIZE OF A MULTIRESOLUTION IMAGE

The present invention relates to the selection of the decoding size of a multiresolution image.

The present invention relates to the field of manipulation of images in the context of the creation of multimedia contents, particularly, but not necessarily, for applications of client-server type.

More particularly, the present invention relates to a method and device for displaying a digital image for creating a multimedia content, and to a method of creating a multimedia content, enabling a content creator to select an optimum size for the display of a coded image in multiple resolutions.

The invention aims at giving to a content creator using for example software of the Macromedia FlashMX type, tools enabling the content creator to select the display size of a given multiresolution image so that the final user, who in this example displays an animation by means of software of the Macromedia FlashPlayer type, has an optimum vision of this image.

The application of the invention to images in the JPEG2000 multiresolution coding format will be described here. Nevertheless, any other multiresolution format may be used.

When a content (typically here a Flash animation) is created, the creator does not necessarily have in mind the size parameters of the coded image which he wishes to include in his animation. Or the creator may not be aware what size the display window will take once the image has been decoded.

The tools assisting the creation of contents existing at the present time (such as for example Macromedia FlashMX) do not work with the JPEG2000 format and, to the knowledge of the applicant, do not use other formats allowing the definition of an image at multiple resolutions. Their principle is as follows: when the content creator decides to include or "import" a given image in a given animation, known tools display this image in a single window, either displaying it at its maximum resolution even though only part of the image may appear in the window (scroll bars are then offered to the user in order to display its missing parts), or displaying the image in its entirety, even though it is necessary to subsample it if the size of the image cannot fit in the screen or window.

Moreover, image manipulation software such as IrfanView and Microsoft PhotoEditor, for example, generally has the same functioning: in the case of a high-resolution image either the image "overflows" or is subsampled.

Systems enabling the user to display high-resolution images at dimensions less than the original sizes whilst exploiting intrinsic characteristics of the image are therefore not known. It is known only that known systems permit the possible loss of information caused by subsampling.

In addition, the document FR-A 2 805 640 proposes tools for the display of JPEG2000 images at sizes different from the original sizes. The method described in this document for this purpose consists of:

given the size of a given display window, recovering, in a JPEG2000 coded image file, the resolution most closely approaching this size;

adapting the display of the image so that the size corresponding to the recovered resolution attains the exact size of the display, either by interpolation if the required size is larger or by subsampling if it is smaller.

This document does not however disclose any tool enabling the content creator to choose the resolution that seems to the creator to be the best adapted, based on an entirely subjective criterion, such as in this case the visual rendition of the image.

The purpose of the invention is to remedy the aforementioned drawbacks, by matching the digital information related to the multiple resolutions contained in the JPEG2000 coding of an image with the subjective visual rendition of these various resolutions.

For this purpose, when the coding of an image naturally contains various resolution levels, the invention proposes to exploit this property in order to provide assistance to the content creator by offering as many display sizes (and therefore as many display windows) as there are resolutions contained in the compressed image.

For this purpose, the present invention provides a method of displaying a digital image for creating a multimedia content, the image being coded in multiple resolutions, remarkable in that it comprises steps consisting of:

determining the number of resolutions present in the coded image, obtaining the data of the sub-images associated with each of the previously determined resolutions, and displaying all the sub-images.

Thus the content creator can choose a display mode corresponding to the content creator's visual rendition requirements whilst relying on real data, not artificially reduced or increased.

In a particular embodiment, the display step consists of displaying, in addition to the image at each of the aforementioned resolutions, information on the volume of the data of each of the sub-images.

This enables the content creator to estimate the data volume necessary for the transmission and future decoding of the animation or multimedia content which he is in the process of creating.

According to a particular feature, the information on the data volume of each of the sub-images comprises a magnification factor with respect to the data volume associated with the smallest resolution and/or the total volume of the binary data associated with each of the resolutions.

The magnification factor supplies information of a relative type on the volume and the total volume supplies information of an absolute type.

In a particular embodiment, the display step consists of simultaneously displaying all the sub-images.

This makes it possible to compare the visual rendition of all the resolutions, which facilitates the choice of the most appropriate resolution.

As a variant, the display step consists of the default display of a sub-image with a predetermined resolution and viewing windows appear as watermark corresponding to the other sub-images, selecting one of the watermark windows making it possible to display the corresponding sub-image.

This makes it possible to display a sub-image directly in the animation being created rather than in an intermediate window. This also makes it possible to display one sub-image and simultaneously to more easily imagine what the others would look like.

As another variant, the display step consists of the default display of a sub-image with a predetermined resolution and accessing the display of the other sub-images by activating action buttons.

This avoids overloading the display window by displaying all the resolutions.

In a favored application of the invention, the image is coded according to the JPEG2000 format.

The invention then allows the simultaneous display of all the resolution possibilities offered by a JPEG2000 image.

In the application to JPEG2000 images, the step of obtaining the data of the sub-images differs according to the order of progression adopted for the image during its coding, vis-à-vis information on resolution, components, spatial position and quality layer.

For the same purpose as mentioned above, the present invention also provides a device for displaying a digital image for creating a multimedia content, the image being coded in multiple resolutions, remarkable in that the device comprises:

- a module for determining the number of resolutions present in the coded image,
- a module for obtaining the data of the sub-images associated with each of the previously determined resolutions, and
- a module for displaying all the sub-images.

Also for the same purpose, the present invention also provides a method for creating a multimedia content, remarkable in that it comprises steps consisting of:

- selecting a digital image to be inserted in the content,
- selecting a resolution associated with one of the sub-images displayed by means of a display method as above, and
- inserting in the multimedia content information on the sub-image with the selected resolution.

It is thus ensured that the final user of the image at the selected resolution will receive an optimized volume of data.

In a particular embodiment, the aforementioned information on the sub-image with the selected resolution consists of a reference to the digital image in coded form and a parameter indicating the selected resolution.

The invention therefore allows use of the image as already present on the server, which avoids having to duplicate the data by recoding the image with the parameters chosen by the content creator.

In addition, in a client-server context, the above embodiment makes it possible to extract from the server only the data strictly necessary for the final use. For example, in the case of the use of the JPEG2000 format, the setting up of a client-server protocol such as JPIP ("JPEG2000 Internet Protocol") will make it possible for the image in question to be repatriated solely at the indicated resolution. In addition, if subsequently the final user has the possibility of changing the resolution, the JPIP protocol will request that solely the missing information is repatriated.

As a variant, the aforementioned information on the sub-image with the selected resolution consists of data representing this sub-image in the coded image, at all resolutions up to the selected resolution. This makes it possible to obtain directly the requested information without having to implement a client-server protocol.

Also for the same purpose, a device is also proposed according to the present invention for creating a multimedia content, remarkable in that it comprises:

- a unit for selecting a digital image to be inserted in the content,
- a unit for selecting a resolution associated with one of the sub-images displayed by means of a display device as above, and
- a unit for inserting in the multimedia content information on the sub-image with the selected resolution.

This device has particular features and advantages similar to those of the method of creating a multimedia content.

The present invention also relates to a communication apparatus comprising a display device as above.

The invention also relates to:

- an information storage means which can be read by a computer or a microprocessor storing computer program instructions, allowing the implementation of a display method as above, and
- an information storage means which is removable, partially or totally, and which can be read by a computer or a microprocessor storing computer program instructions, allowing the implementation of a display method as above.

The invention also relates to a computer program product which can be loaded in a programmable apparatus and comprising sequences of instructions for implementing a display method as above, when this program is loaded onto and executed by the programmable apparatus.

The particular features and the advantages of the display device, of the communication apparatus, of the various storage means and of the computer program product are similar to those of the display method according to the invention, and therefore they are not repeated here.

Other aspects and advantages of the invention will emerge from a reading of the following detailed description of particular embodiments, given by way of non-limiting example. The description refers to the drawings which accompany it, in which:

Figure 1:
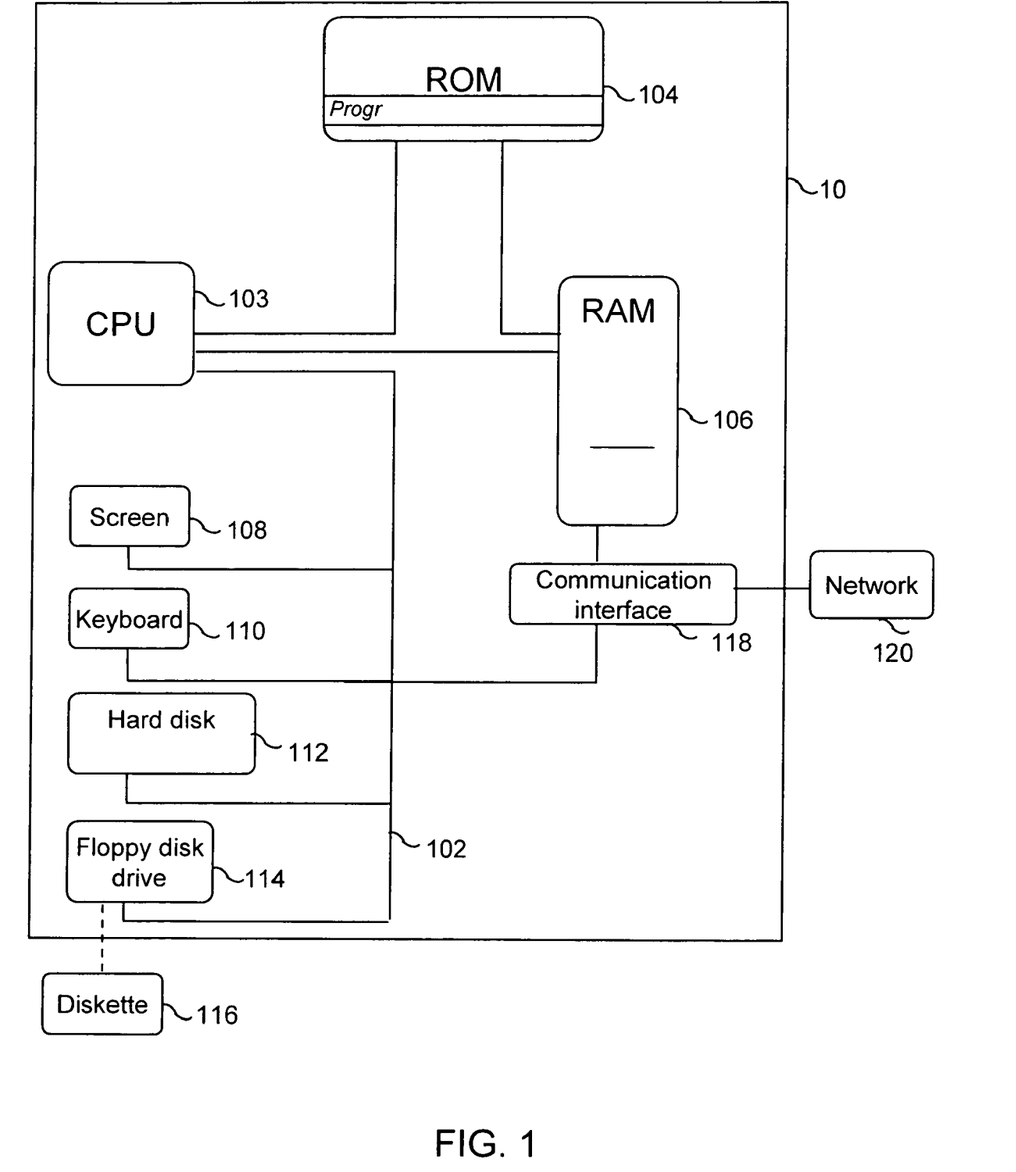
FIG. 1 schematically illustrates a device implementing the present invention, in a particular embodiment.

According to the chosen embodiment depicted in FIG. 1, a device implementing the invention is, for example, a microcomputer 10. In the context of a client-server application, this device can be assimilated to the server.

The device 10 comprises a communication interface 118 connected to a network 120 able to transmit compressed digital data, for example to a final user when the invention is applied in the context of a client-server architecture. The device 10 also comprises a storage means 112 such as, for example, a hard disk. It also comprises a floppy disk drive 114. A diskette 116, like the hard disk 112, can contain compressed data according to the invention as well as the code of a computer program enabling the device 10 to implement the invention which, once read by the device 10, will be stored on the hard disk 112. As a variant, the program enabling the device to implement the invention could be stored in read only memory 104 (for example a ROM). As another variant, the program could be received and stored in an identical fashion to that described previously by means of the communication network 120.

This same device has a screen 108 for displaying the data to be analyzed or serving as an interface with the user, who will be able to parameterize certain analysis modes, by means of the keyboard 110 or any other means (a mouse for example).

The central processing unit 103 (CPU) executes the instructions relating to the implementation of the invention which are stored in the read only memory 104 or in the other storage elements. On powering up, the decoding size selection programs stored in a non-volatile memory, for example the ROM 104, are transferred into the random access memory (RAM) 106, which then contains the executable code of the invention as well as registers for storing the variables necessary for implementing the invention.

Naturally, the diskettes could be replaced by any information medium such as a CD-ROM, DVD-ROM or memory card. In more general terms, an information storage means which can be read by a computer or by a microprocessor, integrated or not into the device, possibly removable, stores a program (file "Progr" in ROM 104) implementing the display method according to the invention.

A communication bus 102 affords communication between the various elements included in the microcomputer 10 or connected to it. The representation of the bus 102 is not limiting and in particular the central unit 103 is liable to communicate instructions to any element of the microcomputer 10 directly or by means of another element of the microcomputer 10.

Figure 2A:
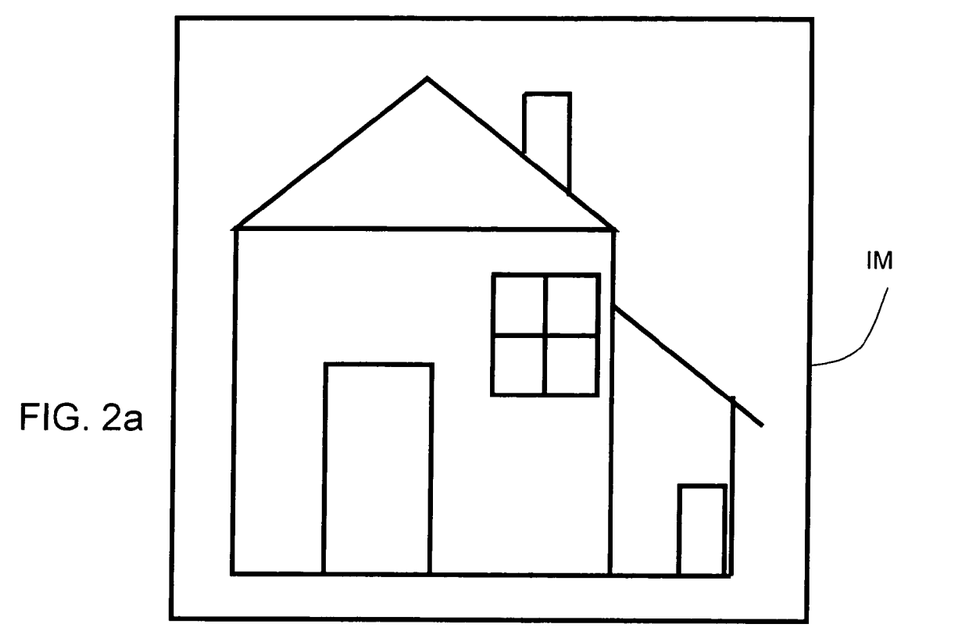
FIG. 2a schematically illustrates an example of a digital image IM.
Figure 2B:
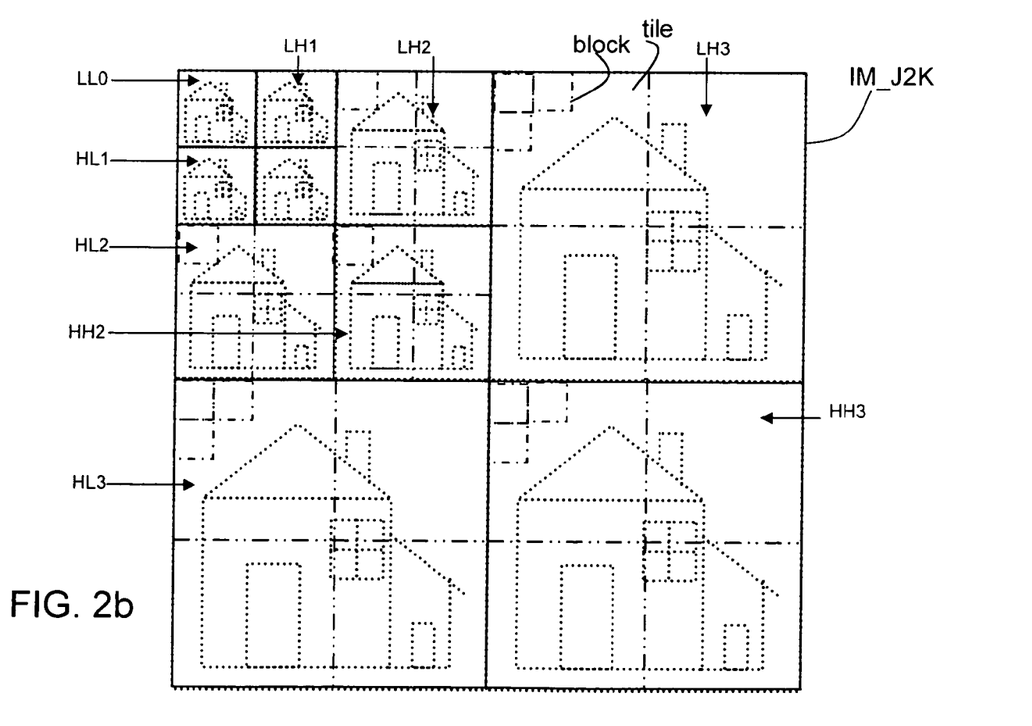
FIG. 2b schematically illustrates the way in which a digital image of the type in FIG. 2a is coded in accordance with the JPEG2000 standard.

FIG. 2a depicts schematically a digital image IM and FIG. 2b depicts schematically the way in which the JPEG2000 standard codes such an image in order to obtain a coded image IM_J2K.

JPEG2000 first of all performs a transformation based on filters, each associated with decimators by two, which filter the image signal in two directions, into sub-band signals of high and low spatial frequencies. These filters generate at each application four data sub-bands $LL_i$, $LH_i$, $HL_i$ and $HH_i$ corresponding respectively, in resolution level i, to the low-frequency information (L) and high-frequency information (H) in each of the two directions in which the filters are applied. The sub-band LL obtained can be used for applying once again the filters in question, thus making it possible to obtain information with a lower resolution. In the example of a coded image given in FIG. 2b, the image IM is decomposed into signals of sub-bands according to three decomposition levels.

Each sub-band signal is a set of real data (it could also represent integers) constructed from the original image, which contains information corresponding to a respectively vertical, horizontal and diagonal orientation of the content of the image, in a given frequency band. Each sub-band signal can be assimilated to a (small) image; hereinafter, the term "sub-image" will be given to the inverse transformation of all the sub-band signals of a given resolution, given that, if there are lower resolutions, the signal LL of the resolution concerned is first of all reconstructed from the lower resolutions.

It should be noted that the image IM_J2K is, for example, separated into areas, referred to as tiles, only some of which have been depicted in order not to overload the figure. The decomposition of the image can be carried out tile by tile. By collecting together in the same window the various reconstructions resulting from the tile by tile decomposition of the image, the complete image is obtained.

Moreover, each tile of the image is partitioned into code blocks, some of which are depicted in FIG. 2b. It should be noted that the partitioning of the image into tiles is not a necessity for implementing the invention, and it will also be considered hereinafter that an image consists of a single tile. In the case of coding by several tiles, it will suffice to apply the methods described below to each of these tiles.

In our example of coding in a single tile, the image is then solely partitioned into code blocks which undergo various processings, in particular a quantization and entropic coding phase. The organization of the image as a data flow or bitstream depends on a choice of progression to be made by the coder:

LRCP: Layer-Resolution-Component-spatial Position;
RLCP: Resolution-Layer-Component-spatial Position;
RPCL: Resolution-spatial Position-Component-Layer;
PCRL: spatial Position-Component-Resolution-Layer;
CPRL: Component-spatial Position-Resolution-Layer;

These various possibilities make it possible to organize the information so as to be able to decode it progressively according to different criteria: first of all the resolution information (R) or component information (C) or spatial position information (P) or quality layer information (L). Each additional quality layer makes it possible to refine the data already received. According to the progression organization chosen, it will therefore be possible to decode the image in a progressive spatial fashion or resolution by resolution, etc. In the context of the invention, it will therefore be a case of recovering the information with a given resolution where it is situated, whatever the organization chosen.

The coded image also comprises header information which makes it possible, as soon as it is received, to have information on the coding of the signal and the organization of the data flow.

FIGS. 3a, 3b, 3c, 3d and 3e illustrate an example of a graphical interface offered to the content creator in accordance with the invention.

Figure 3A:
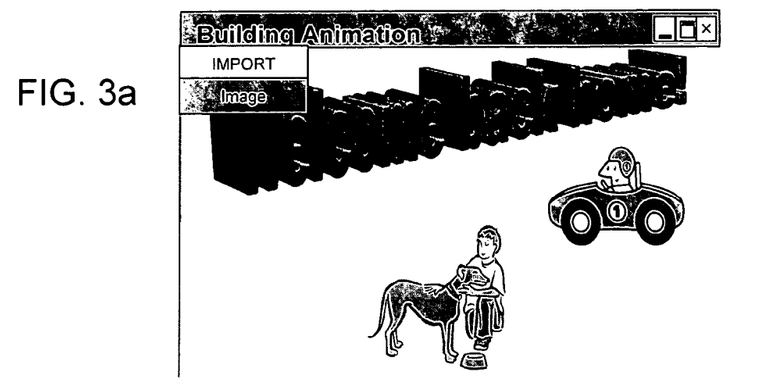
FIGS. 3a, 3b, 3c, 3d and 3e illustrate an example of a graphical interface offered to a content creator in accordance with the present invention.

FIG. 3a shows an animation being created. When the creator wishes to integrate a JPEG2000 image therein, the creator chooses the appropriate menu in his creation software (for example "IMPORT→Image").

Figure 3B:
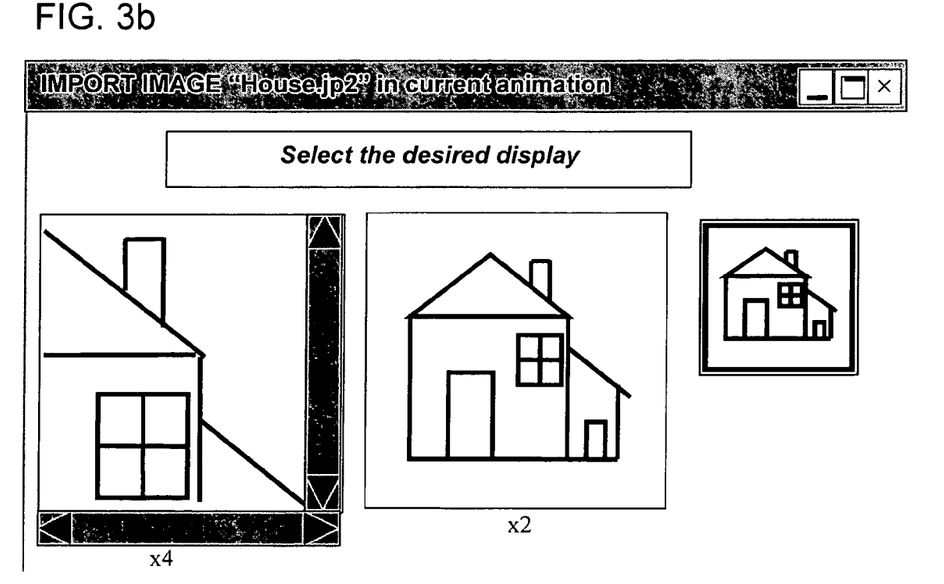

It is at this moment that the invention intervenes, as described below in relation to FIGS. 4 to 6: the various resolutions present in the image are decoded and displayed simultaneously, each as a sub-image. In our example, the JPEG2000 image required by the content creator is defined on three resolution levels as illustrated in FIG. 3b. It should be noted in passing that, if some resolutions turn out to result in excessively large dimensions of the sub-image, the display software may easily decide to offer the display of only part of this sub-image (for example the roof and window of the house, on the left in FIG. 3b). The aim is in fact to show what levels of detail and what image sizes the creator should expect.

It will, if necessary, also be possible to display information on the volume of the compressed data corresponding to each of the sub-images, such as for example a magnification factor with respect to the smallest resolution (cf. "x2" and "x4" in FIG. 3b) or even the total volume of the binary data to be transmitted for each resolution. This volume information is accessible in the JPEG2000 format and can easily be extracted by a person skilled in the art, who will for example be able to refer to the JPEG2000 standard or to the work by David. S. Taubman and Michael W. Marcellin entitled "*JPEG2000, Image Compression Fundamentals, Standards and Practice*", Kluwer International Series in Engineering and Computer Science, 642, 2002.

The creator next chooses the sub-image which the creator prefers for it to be integrated in his animation. In the example in FIG. 3b, the creator selects the first resolution level (the house at top right). This selection can for example be made by clicking on a mouse, or by acting on the keyboard or on a touch screen, these examples not being limiting.

Figure 3C:
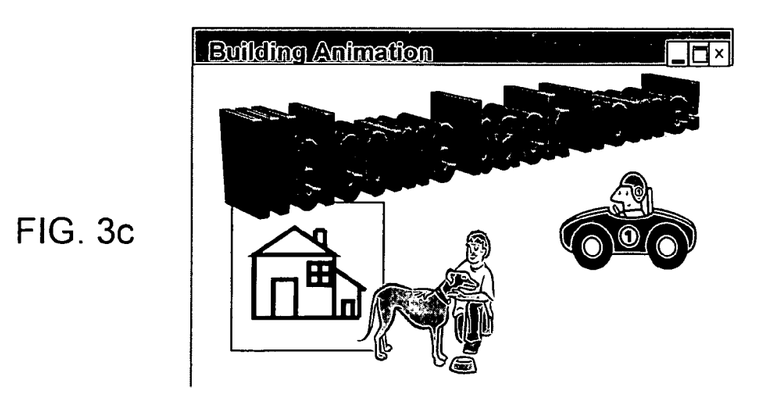
Figure 3D:
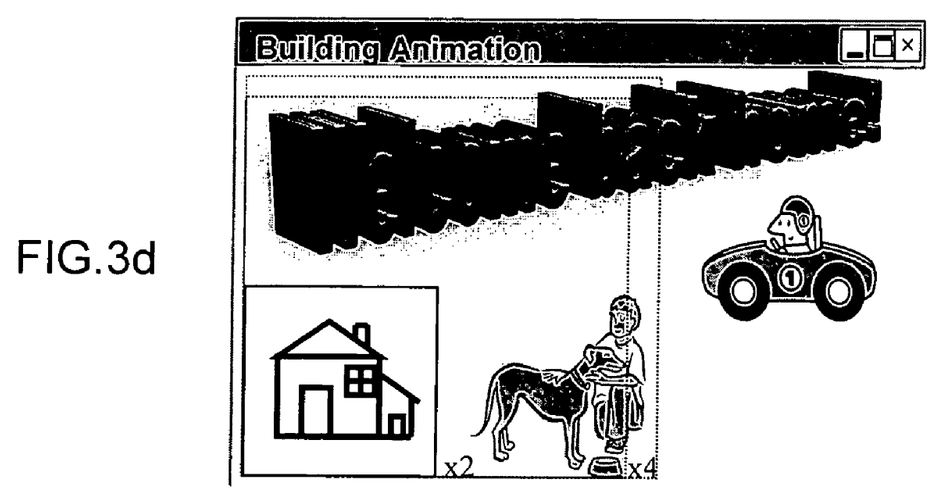
Figure 3E:
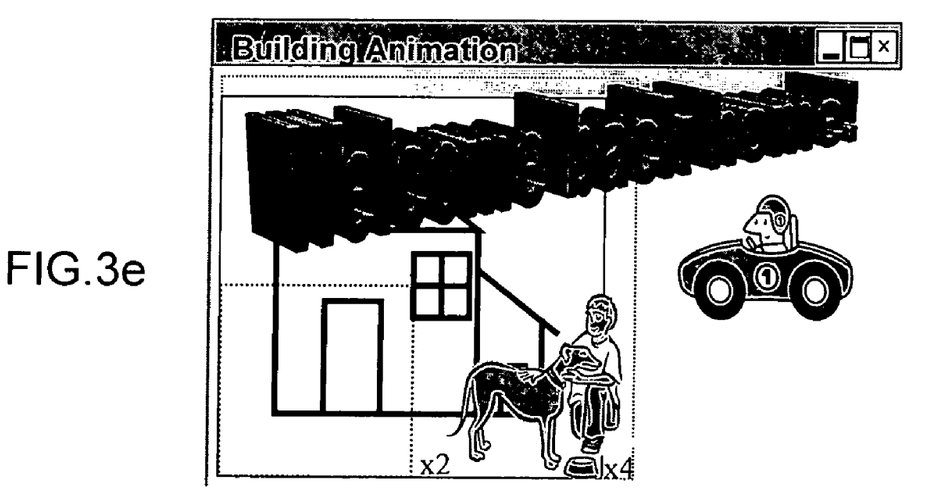

The multiple display window then closes in order to leave room for the previous animation creation window, where it can be seen, as shown in FIG. 3c, that the sub-image chosen in FIG. 3b is now integrated.

As a variant, it is possible to imagine multiple interfaces giving the same information and choice to the content creator as the interface shown in FIG. 3b. For example, it can be envisaged that the animation window (FIG. 3a) passes through the step in FIG. 3d when the menu "IMPORT→Image" is validated. In this figure, it can be seen that the JPEG2000 image chosen is displayed at its smallest resolution and that the windows of the other resolutions appear as watermark windows. The selection of one of the watermark windows will make it possible to display this resolution (cf. FIG. 3e). Next, an action such as a double click by means of a mouse on the resolution which the creator considers to be the most appropriate enables the content creator to validate his choice and to return to FIG. 3c (it will be assumed here that the content creator double clicks on the smallest size offered).

Another variant consists of having resolutions displayed "on request", for example by offering the user, by default, the lowest resolution and prompting him to click on a "higher resolution " button, valid until the maximum resolution is reached, or on buttons "x2", "x4", etc in order to display the higher resolutions, the latter buttons then indicating the magnification factor of the volume of the data to be transmitted.

Figure 4:
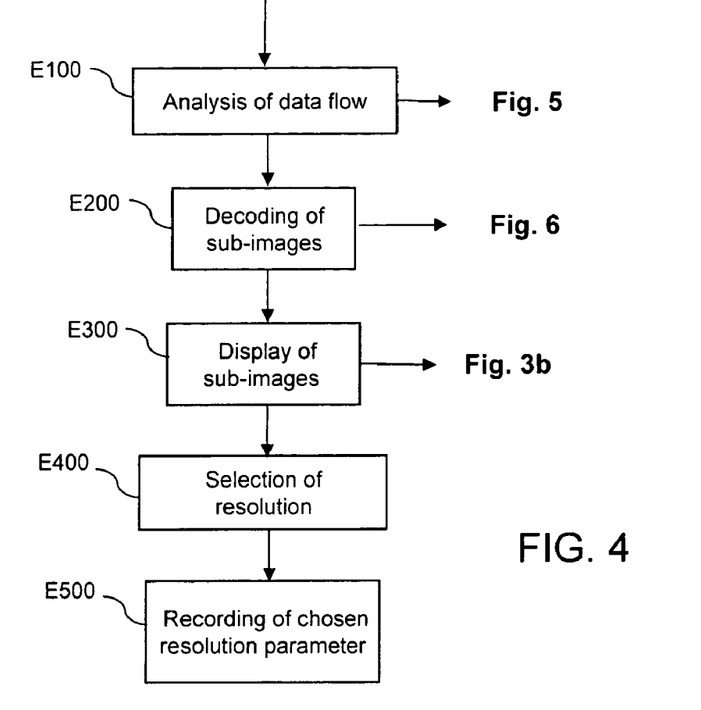
FIG. 4 is a flow diagram illustrating the main steps of a method of creating a multimedia content in accordance with the present invention, in a particular embodiment.

The flow diagram in FIG. 4 depicts the main steps of a method of creating a multimedia content in accordance with the invention, in a particular embodiment. This succession of steps is triggered when the menu "IMPORT→Image" in FIG. 3a is activated, and ends at the display illustrated in FIG. 3b.

An image IM_J2K, coded according to the JPEG2000 format and, an example of which is depicted in FIG. 2b, is processed by this algorithm.

Step E100 consists of analyzing the data flow as detailed below in relation to FIG. 5, in order to extract therefrom the parameters necessary for the remainder of the method.

Step E200 then consists of decoding all the sub-images contained in the file IM_J2K, as detailed below in relation to FIG. 6.

Each of these sub-images is then displayed during step E300, as for example illustrated in FIG. 3b.

Step E400 enables the content creator to choose the display resolution which best suits his animation. This is for example achieved by means of the graphical interface illustrated in FIG. 3b.

Finally, step E500 consists of recording, in the file describing the animation, information on the chosen sub-image. In a client-server context, this information can typically be a reference (the address of the server and the name of the file of the coded image) followed by the parameter r of the chosen resolution. This solution has the advantage of not creating a new compressed image file of resolution r in addition to the compressed image file at the original resolution; this is because the JPIP protocol (see the description of FIG. 7a below) can then ask to recover the data corresponding to resolutions 0 to r for a given image. In another context, it is possible to directly include the data of the resolutions 0 to r extracted from the file of the coded image, that is to say to include a JPEG2000 file describing the sub-image, in the animation file. Generating such a JPEG2000 file is within the capability of a person skilled in the art since multiple resolutions are already defined in the JPEG2000 format. This solution also has the advantage of not requiring the setting up of a client-server protocol.

Figure 5:
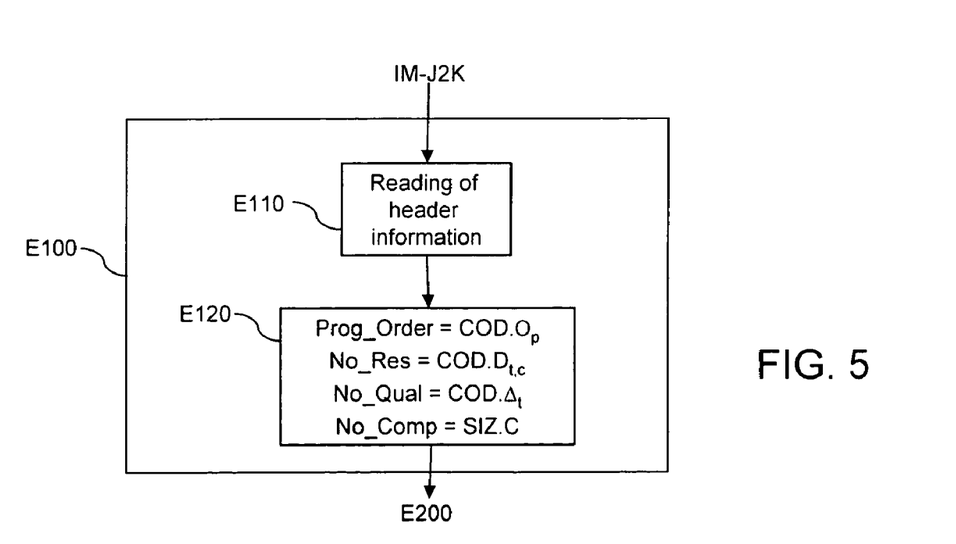
FIG. 5 illustrates step E100 of FIG. 4 in more detail.

FIG. 5 illustrates in more detail the step E100 of FIG. 4.

Step E110 consists of recovering information useful to the invention and contained in the various headers of the file containing the coded image IM_J2K: main header (MAIN_HEADER), tile headers (TILE_HEADERS), etc.

Step E120, from this information, makes it possible to allocate values to variables useful to the correct progress of the method:

Prog_Order=order of progression chosen during the coding of the image, for example RLCP (resolution-layer-component-spatial position);

No_Res=number of resolutions possible, that is to say the number of levels of transformations performed;

No_Qual=number of quality levels defined for this image;

No_Comp=number of components of the image.

These values can all be found in the main header of the file IM_J2K, or sometimes elsewhere such as in the tile headers for example. It will not be attempted here to describe all the possibilities since the JPEG2000 standard explains them amply and it is easy for a person skilled in the art to correctly implement all these possibilities, either from the standard or for example from the aforesaid work by David. S. Taubman and Michael W. Marcellin. FIG. 5 uses acronyms explained in these documents, such as "COD", which represent the header part describing the coding type, or "SIZ", which is a header segment dedicated to the size information.

The fields of the segment COD more particularly used here are:

$O_p$, which indicates the order of progression chosen for the coding;

$D_{t,c}$, which gives the number of transformation levels of the current tile;

$\Delta_t$, which corresponds to the number of quality levels of the current tile.

The notation "X.Y" used in the drawing signifies that it is a case of the field Y in the segment X.

Thus, in the segment SIZ, at least the field "C" (number of components) will be useful to the correct progress of the method.

Figure 6:
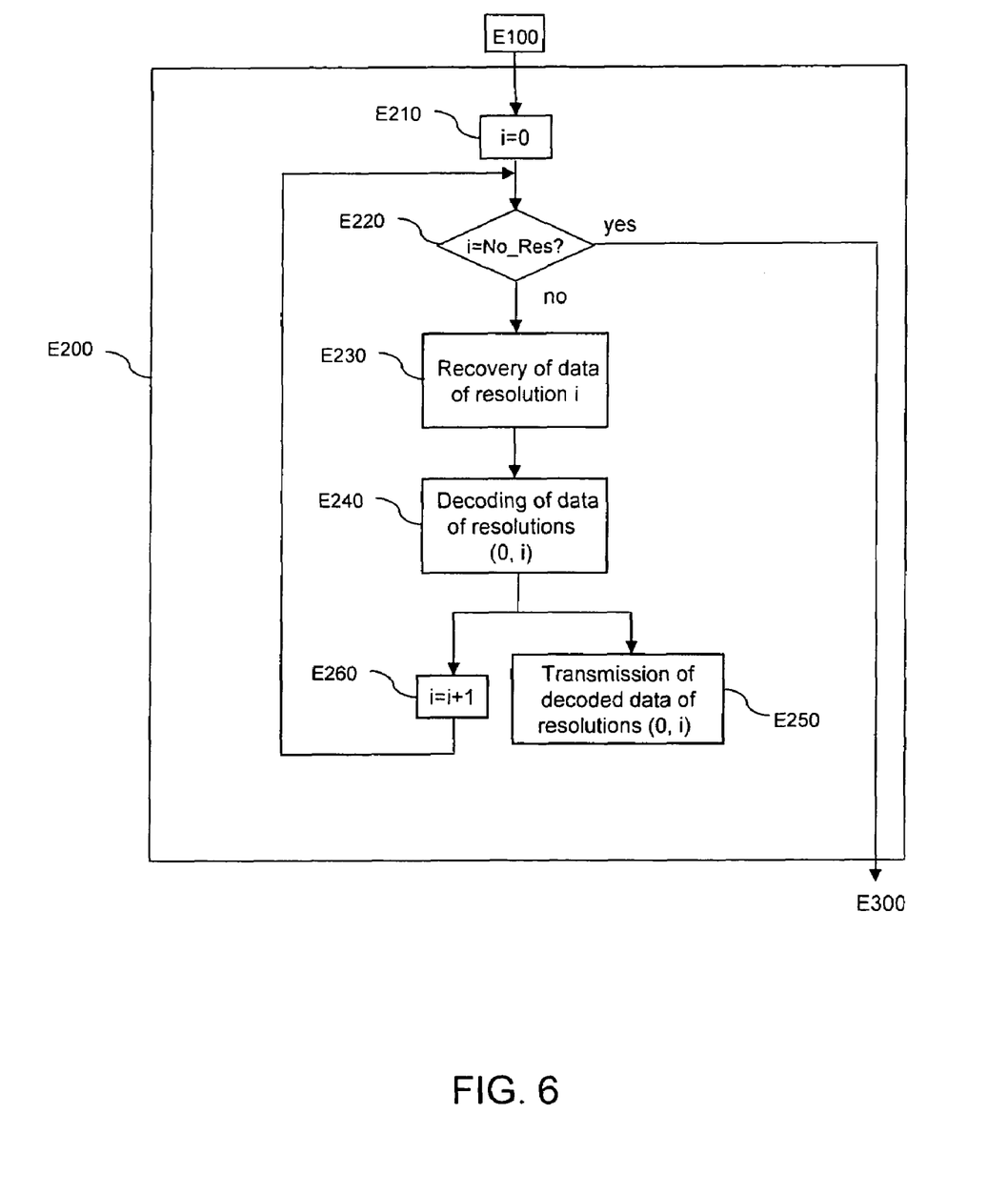
FIG. 6 illustrates step E200 of FIG. 4 in more detail.

FIG. 6 illustrates in more detail step E200 in FIG. 4.

Step E210 consists of initializing a variable i to 0. This variable then makes it possible to run through all the resolutions of the image.

Step E220 consists of comparing this variable with the total number of resolutions No_Res recovered at step E120 (FIG. 5). If this number is not reached, it is because there still remain resolutions to be decoded. The next step is then step E230, which consists of recovering all the binary data making up the resolution i, in a manner known to persons skilled in the art. In particular, according to the order of progression adopted for this image at the time of its coding, the processing will be different.

For example, if Prog_Order is equal to RLCP (resolution-layer-component-position), this means that the bitstream of the image IM_J2K offers an organization first of all by resolution, and then, for each resolution, by quality layer, then by component and finally by spatial position. Extracting the binary data of a resolution i therefore consists quite simply of starting at the position in the file IM_J2K on the start-of-resolution-i marker, and extracting the data as far as the next new resolution marker.

On the other hand, if Prog_Order is equal to LRCP (layer-resolution-component-position), this signifies that the organization of the bits carried out by quality layer and then, for each layer, by resolution, then by component and finally by spatial position. In this case, extracting the information from the resolution i consists of running through each quality layer and, for each of them, extracting all the data corresponding to the resolution i.

In fact, in addition to extracting the information from resolution i, it is concatenated with the information extracted during the previous iterations, that is to say the information relating to the resolutions from 0 to i−1. This is because the purpose of the algorithm in FIG. 6 is to recover the information corresponding to all the sub-images to be displayed; however, each sub-image consists of the lower resolutions as well as information peculiar to its resolution.

Once all the binary data of a given sub-image has been connected together, step E240 consists of carrying out the "conventional" JPEG2000 decoding of this data, in order to obtain the sub-image of resolution i.

On the one hand, the next step is step E250, which makes it possible to transmit this data to the display (which comes into action at step E300 in FIG. 4 and which is also illustrated in FIG. 3b). On the other hand, the counter i is incremented by one unit (step E260) in order to return to step E220, which consists of testing whether or not all the resolutions and therefore all the sub-images have been processed. If such is the case, the following step is the display (step E300 in FIG. 4).

As a variant, steps E250 and E240 could be carried out simultaneously in order to optimize the display time and exploit the progressiveness characteristics of the JPEG2000 bitstream. This is because the various progressions offered in JPEG2000 make it possible to exploit the data "on the fly" rather than only once all the data is received.

Figure 7A:
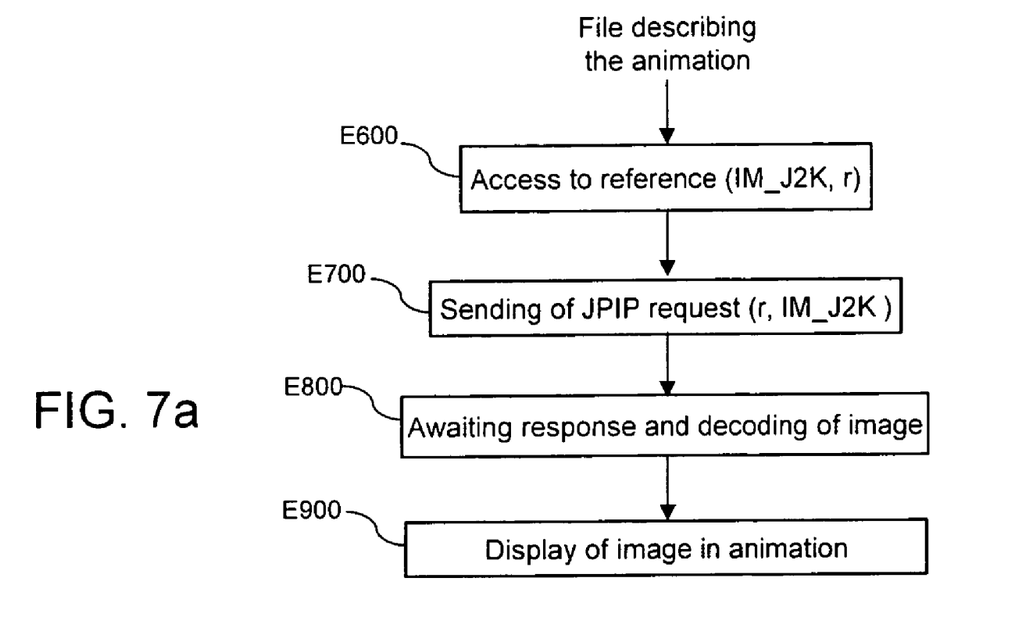
FIGS. 7a and 7b are flow diagrams illustrating an example of use of the invention in relation to an animation file of the Flash type.
Figure 7B:
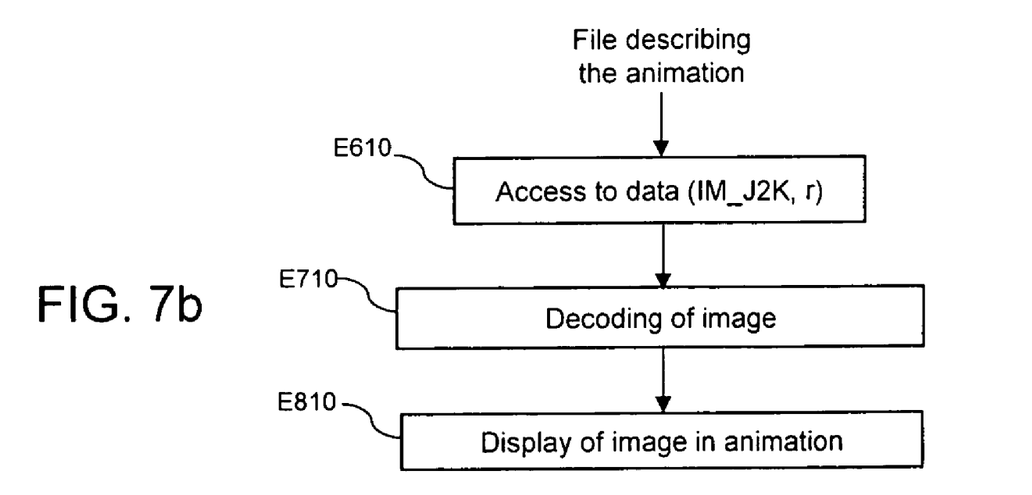

The purpose of the flow diagrams in FIGS. 7a and 7b is to give an example of use of the invention in an animation file of the Flash type by the final user.

FIG. 7a illustrates such a use in a client-server context. Step E600 consists of accessing the reference (IM_J2K,r), that is to say at the place in the file where the reference of the JPEG2000 image concerned is encountered. In accordance with the invention, this reference is accompanied by the parameter of resolution r chosen by the content creator, as described above (step 500 in FIG. 4).

During step E700, a request JPIP is set up and sent to the server, formulating the need to recover the information of the image IM_J2K as far as resolution r. A protocol other than JPIP can of course be used. The protocol of JPIP has the advantage of being standardized.

Step E800 consists of receiving the response to the request sent before and of decoding the corresponding image (or sub-image).

Step E900 consists of displaying the decoded image in the animation, with the parameters defined by the content creator.

If the invention does not use a client-server protocol, the animation file described above can contain all the data necessary for the decoding of the image. FIG. 7b illustrates this situation. It is assumed that the result of step E500 in FIG. 4 includes all the coded data of the sub-image in the file describing the animation.

Step E610 consists of accessing the data (IM_J2K,r), that is to say at the point in the file where the description of the JPEG2000 image corresponding to the sub-image of resolution r chosen at the time of coding starts. In accordance with the invention, this description of the image comprises all the information corresponding to the resolutions 0 to r in the original image IM_J2K.

During step E710, the corresponding image is decoded.

Step E810 consists of displaying the decoded image in the animation, with the parameters defined by the content creator.

Figure 8:
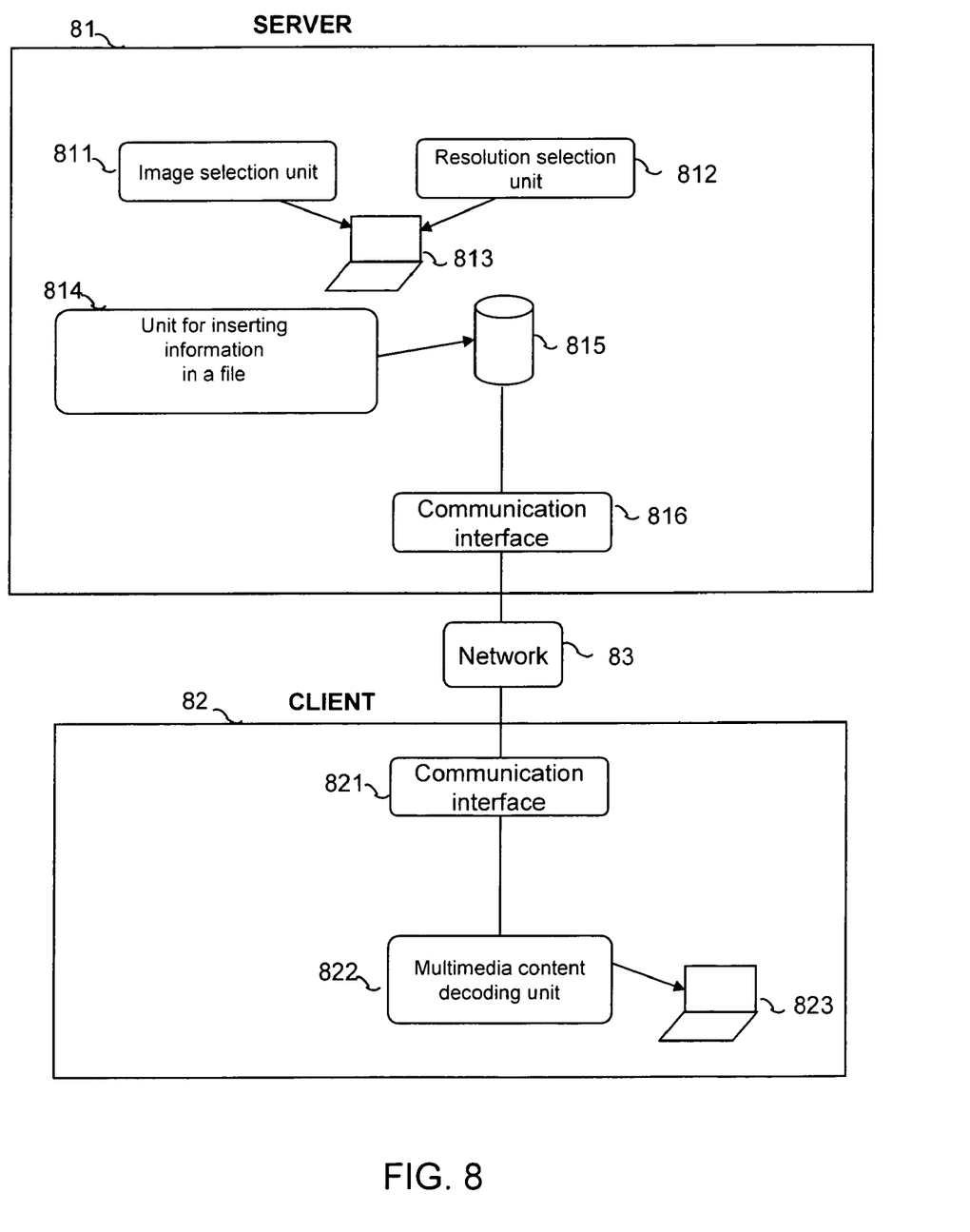
FIG. 8 illustrates schematically a device using the invention in a client-server context.

FIG. 8 illustrates a device incorporating an embodiment of the invention in a client-server context.

The device 81, assimilated to the server, comprises a communication interface 816 connected to a network 83 able to transmit digital data to the final user. This communication interface will or will not implement a protocol specific to the data conveyed (for example JPIP). The device 81 also comprises a unit for displaying and selecting images 813 such as a keyboard-screen-mouse assembly. An image selection unit 811 makes it possible to choose an image on the assembly 813. A resolution selection unit 812, able to implement a selection process as described previously, also interacts with the assembly 813. The unit 814 makes it possible to insert information, obtained by the method according to the present invention, in a multimedia content.

The device 81 also comprises a storage unit 815 such as for example a hard disk, on which the compressed digital images and the animation multimedia contents created by the content creator are conventionally recorded.

It is assumed here that the content creation takes place on the same machine as the server. It can be imagined that the content creation software is offset on a dedicated machine separate from the server, in which case the units 811, 812, 813 and 814 would be on this dedicated machine and the multimedia content for its part would be transmitted by a conventional communication interface to the storage unit 815 of the server.

A file containing an animation is, at the request of the final user, transferred to a client machine 82 of this user, via the network 83. A communication interface 821, compatible with the communication interface 816 of the server 81, receives this file in order to transmit it to a unit 822 for decoding a multimedia content able to decipher and display the animation on a display assembly 823 composed of at least one screen.

The invention claimed is:

1. A method of creating a multimedia content, characterized in that the method comprises:
   performing by a processor the following steps:
   a step of selecting a digital image to be inserted in the multimedia content,
   a step of selecting a resolution associated with a sub-image of one or more sub-images displayed by means of a display method comprising the steps of:
   a step of determining a set of resolutions present in the digital image;
   a step of obtaining coded data of the sub-images associated with each of the resolutions determined during said determining step, wherein said obtaining step includes a step of extracting from said digital image all data necessary to decode all the resolutions;
   a step of decoding the obtained coded data, before displaying any sub-image, so as to obtain a sub-image associated with each previously determined resolution; and
   a step of displaying all the sub-images; and
   a step of recording in a file describing the multimedia content, information on the sub-image with the selected resolution, which is a highest resolution that can be retrieved by an end user when displaying the multimedia content.

2. A method according to claim 1, characterized in that the display step consists of displaying, in addition to the image at each of said resolutions, information on the volume of the data of each of the sub-images.

3. A method according to claim 2, characterized in that the information on the data volume of each of the sub-images comprises a magnification factor with respect to the data volume associated with the smallest resolution and/or the total volume of the binary data associated with each of said resolutions.

4. A method according to claim 1, 2 or 3, characterized in that the display step consists of displaying simultaneously all the sub-images.

5. A method according to claim 1, 2 or 3, characterized in that the display step consists of the default display of a sub-image with a predetermined resolution and viewing windows appear as a watermark corresponding to the other sub-images, selecting one of the watermark windows making it possible to display the corresponding sub-image.

6. A method according to claim 1, 2 or 3, characterized in that the display step consists of the default display of a sub-image with a predetermined resolution and accessing the display of the other sub-images by activating action buttons.

7. A method according claim 1, 2 or 3, characterized in that the image is coded to the JPEG2000 format.

8. A method according to claim 7, characterized in that the step of obtaining the data of the sub-images differs according to the order of progression adopted for the image during its coding, vis-à-vis information on resolution (R), components (C), spatial position (P) and quality layer (L).

9. A method according to claim 1, characterized in that said information on the sub-image with the selected resolution consist of a reference to the digital image in coded form and a parameter indicating the resolution selected.

10. A method according to claim 1, characterized in that said information on the sub-image with the selected resolution consists of data representing said sub-image in the coded image, at all resolutions up to the selected resolution.

11. A device for creating a multimedia content, characterized in that the device comprises:
means for selecting a digital image to be inserted in the content;
means for selecting a resolution associated with a sub-image of one or more sub-images displayed by means of a display device comprising:
means for determining a set of resolutions present in the digital image;
means for obtaining coded data of the one or more sub-images associated with each of the resolutions determined by said determining means, wherein said obtaining means includes a means for extracting from said coded image all data necessary to decode all resolutions;
means for decoding the obtained coded data, before displaying any sub-image, so as to obtain a sub-image associated with each previously determined resolution; and
means for displaying all the sub-images; and
means for recording in a file describing the multimedia content, information on the sub-image with the selected resolution, which is a highest resolution that can be retrieved by an end user when displaying the multimedia content.

12. A device according to claim 11, characterized in that the display means are adapted to display, in addition to the image at each of said resolutions, information on the volume of the data of each of the sub-images.

13. A device according to claim 12, characterized in that the information on the volume of the data of each of the sub-images comprise a magnification factor with respect to the data volume associated with the smallest resolution and/or the total volume of the binary data associated with each of the said resolutions.

14. A device according to claim 11, 12 or 13, characterized in that the display means are adapted to display simultaneously all the sub-images.

15. A device according to claim 11, 12 or 13, characterized in that the display means are adapted to display, by default, a sub-image with a predetermined resolution and watermark windows corresponding to the other sub-images, the selection of one of the watermark windows making it possible to display the corresponding sub-image.

16. A device according to claim 11, 12 or 13, characterized in that the display means are adapted to display by default a sub-image with a predetermined resolution and comprise action buttons whose activation displays the other sub-images.

17. A device according to claim 11, 12 or 13, characterized in that the image is coded to the JPEG2000 format.

18. Device according to claim 17, characterized in that the means of obtaining data of the sub-images differ according to the progression order adopted for the image at the time of its coding vis-à-vis information on resolution (R), components (C), spatial position (P) and quality layer (L).

19. A device according to claim 11, characterized in that said information on the sub-image with the selected resolution consists of a reference to the digital image in coded form and a parameter indicating the selected resolution.

20. A device according to claim 11, characterized in that said information on the sub-image with the selected resolution consists of data representing said sub-image in the coded image, at all resolutions up to the selected resolution.

21. A communication apparatus, characterized in that it comprises a display device according to claim 11, 12 or 13.

* * * * *